UNITED STATES PATENT OFFICE.

HENRY DECANNIERE AND ALVIN F. HARRISON, OF GREELEY, KANSAS.

PROCESS OF PRESERVING EGGS.

SPECIFICATION forming part of Letters Patent No. 371,254, dated October 11, 1887.

Application filed April 18, 1887. Serial No. 235,239. (No specimens.)

*To all whom it may concern:*

Be it known that we, HENRY DECANNIERE and ALVIN F. HARRISON, citizens of the United States, residing at Greeley, in the county of Anderson and State of Kansas, have invented certain new and useful Improvements in Processes of Preserving Eggs; and we do declare the following to be a full, clear, and exact description of the invention, such as will enable others skilled in the art to which it appertains to make and use the same.

Our invention relates to an improved process of preserving eggs, as more fully hereinafter described and claimed.

The compound or solution which we employ consists of water, limestone-lime, soda, salt, and saltpeter.

In carrying out our invention we proceed as follows: We first slake fifteen pounds of lime in four gallons of water, and after the lime has been thoroughly slaked we add six gallons of water, one quart of salt, and one-half pound of soda. After dissolving one-half pound of saltpeter in a half-pint of warm water it is added to the compound and the whole is thoroughly stirred at intervals of one hour for six hours, after which the compound is allowed to stand for twenty-four hours. The clear liquid is then removed and carefully strained into the barrel in which the eggs have been packed. The liquid should fill the barrel to within about three inches of its top, and the top layer of eggs should be at least two inches below the surface of the liquid. A covering of cloth is then placed upon the upper course of eggs, and a layer or coating of sediment taken from the bottom of the barrel or vessel in which the compound was first prepared is placed upon the cloth. The space remaining above the coating of lime is then filled with the clear liquid, and the barrel is tightly covered to prevent the evaporation of the solution.

Eggs preserved in this manner will remain perfectly sweet and sound for an indefinite period. The shell remains unchanged and its contents are prevented from shrinking.

Having thus described our invention and set forth its merits, what we claim to be new, and desire to secure by Letters Patent, is—

1. The herein-described process for preserving eggs, which consists in first immersing the eggs in brine consisting of water, lime, salt, soda, and saltpeter, in a suitable receptacle, next covering the upper layer with a cloth, next placing upon said cloth a coating of the sediment of said brine, and finally sealing the receptacle, substantially as described.

2. As an improvement in the art of preserving eggs, the herein described process, which consists in forming a solution of water, lime, soda, salt, and saltpeter, agitating the same meanwhile, decanting the same, next covering the eggs, which have been placed in a suitable receptacle, with the decanted liquid, next placing a covering of cloth over the top layer of eggs, next covering said cloth with the sediment of said solution, next filling the space above said coating with the clear liquid, and finally sealing said receptacle, substantially as described.

In testimony whereof we affix our signatures in presence of two witnesses.

HENRY DECANNIERE.
ALVIN F. HARRISON.

Witnesses:
JOHN SPROUL,
F. Z. KINCAID.